United States Patent [19]
McIntyre et al.

[11] Patent Number: 6,091,909
[45] Date of Patent: Jul. 18, 2000

[54] BATTERY CONTROL FOR DIGITAL CAMERA AND INTEGRAL PRINTER

[75] Inventors: Dale F. McIntyre, Honeoye Falls; Loretta E. Allen, Hilton, both of N.Y.

[73] Assignee: Eastman Kodak Company, Rochester, N.Y.

[21] Appl. No.: 09/198,745

[22] Filed: Nov. 24, 1998

[51] Int. Cl.[7] ...................................................... G03B 7/26
[52] U.S. Cl. ......................... 396/278; 396/301; 348/372; 348/375
[58] Field of Search .................................... 396/277, 278, 396/301; 348/333, 373, 375, 376, 372

[56] References Cited

U.S. PATENT DOCUMENTS

| | | | |
|---|---|---|---|
| 4,188,105 | 2/1980 | Erlichman . | |
| 4,697,909 | 10/1987 | Machida et al. | 396/278 |
| 5,847,836 | 12/1998 | Suzuki | 348/296 |
| 5,894,326 | 4/1999 | McIntyre et al. | 348/333 |
| 5,917,548 | 6/1999 | McIntyre | 348/333 |

*Primary Examiner*—Russell Adams
*Attorney, Agent, or Firm*—Raymond L. Owens

[57] ABSTRACT

A digital camera having image capture and processing electronics receives a first battery for operating the image capture and processing electronics of the digital camera and has an integral printer having a removable cartridge for printing captured images on receivers. The integral cartridge includes cartridge interface and printer actuator electronics and a second battery in the cartridge for operating the cartridge interface and printer actuator electronics.

9 Claims, 9 Drawing Sheets

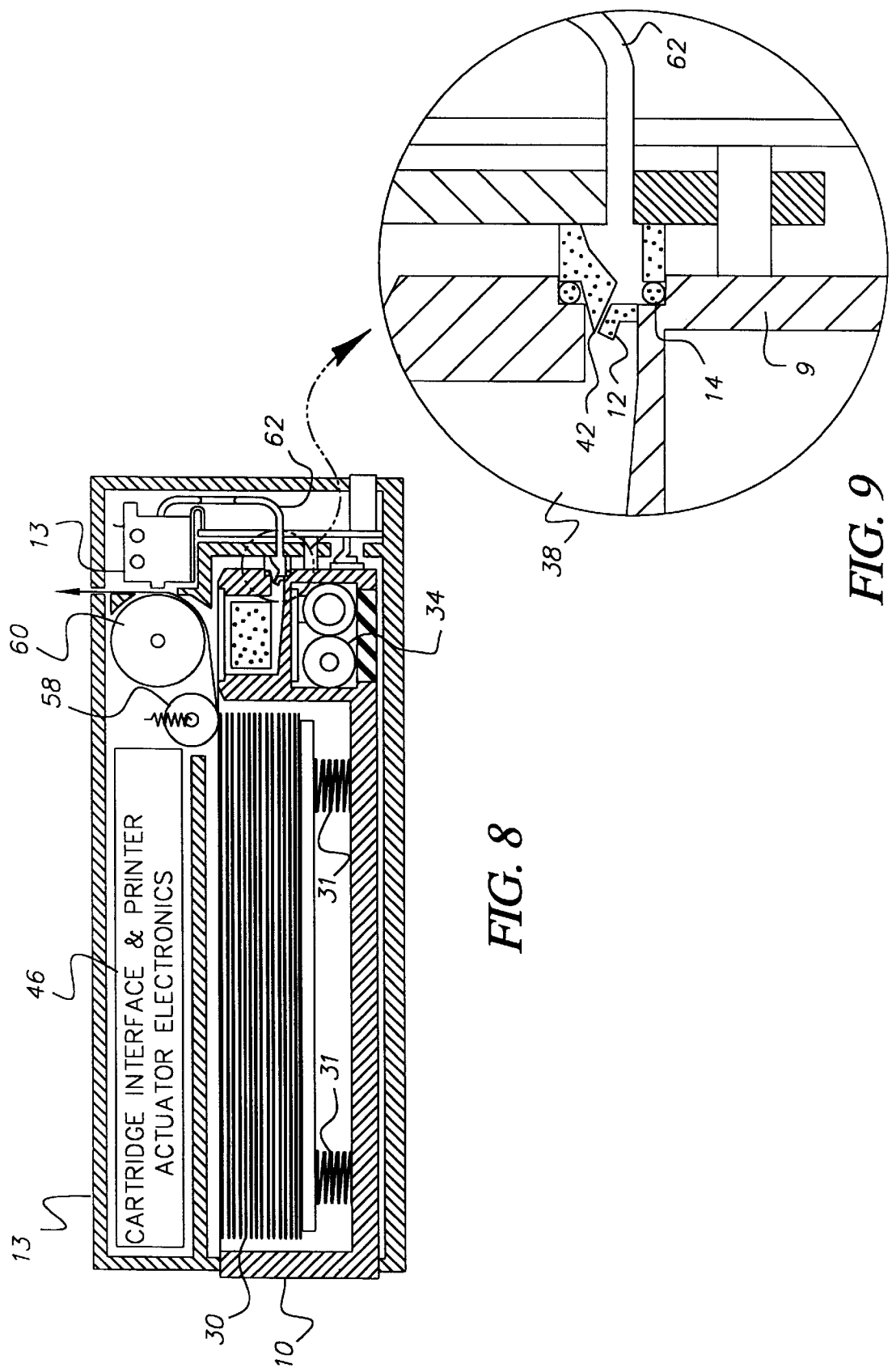

6,091,909

BATTERY CONTROL FOR DIGITAL CAMERA AND INTEGRAL PRINTER

CROSS REFERENCE TO RELATED APPLICATIONS

Reference is made to commonly assigned U.S. patent application Ser. No. 09/198,746 filed concurrently herewith entitled "Insertable Cartridge for Digital Camera with Ink Jet Printer" to Dale F. McIntyre et al., and U.S. patent application Ser. No. 09/199,291 filed concurrently herewith entitled "Insertable Thermal Printer Cartridges for Digital Camera" to Dale F. McIntyre et al., the disclosures of which are incorporated herein by reference.

FIELD OF THE INVENTION

This invention relates to digital cameras that include integral printers having an insertable cartridge with a battery and, more particularly, to electively using the cartridge battery to power the camera.

BACKGROUND OF THE INVENTION

Instant photography has long supplied the consumer with rapidly developed silver halide images. Furthermore, it is known in the field of instant photography to supply a battery in the replaceable cartridge of silver halide receiver sheets to insure that the camera had a fresh power supply each time it was loaded with a film pack. The camera used the battery to power all aspects of the camera including flash, focus, exposure and developing. Without the film pack, the camera wasn't functional.

One problem with the film pack for instant cameras is that the removal of the film pack prevents further image capture. The sole source for powering the camera is the battery within the insertable film pack. Without a film pack in the camera, the camera has no useful purpose since the camera does not store images except on instant film. The camera may include features which prevent a user from using the camera without the inserted film pack. Otherwise, the continued of the use of the camera only serves to mislead the consumer into thinking that an exposure had been made. In U.S. Pat. No. 4,188,105 to Erlichman, such a film pack is shown wherein the last sheet in the film pack causes a dielectric material to be inserted between the battery contacts and the power receiving terminals of the camera, effectively insulating the battery from the camera. In this art, it is important to insure that once the film pack was exhausted of exposures, that the consumer would be prevented from using the camera and thus being fooled that an exposure was being made.

Digital cameras, such as the model DC-260 manufactured by the Eastman Kodak Co., have become increasingly popular with consumers. Such cameras provide the consumer with instant feedback on the outcome of the picture with the color LCD located on the rear of the camera. Printed images from such cameras must be obtained by connecting the camera or its removable memory to a computer with an attached printer or to a printer capable of interfacing directly with digital cameras. An example of such a printer which connects directly to the camera is the DPP-M55 digital color photo printer manufactured by SONY, Inc. It uses an infrared link to communicate with the camera.

It is quite advantageous to use a printer which is integrally formed with the camera so that a printed image can be made without having to connect the camera or its removable memory to a computer with an attached printer or directly to a printer. Recently, ALPS Electric Co., LTD of Japan introduced the PTMTL1101A resistive thermal printer mechanism and replaceable cartridge complete with donor and receiver sheets. The PTMTL1101A thermal printer mechanism is to be integrated into a digital camera for providing rapidly printed images without needing a computer.

Another problem with the prior art is that digital cameras consume considerable amounts of battery energy to power the image capture with a charge-coupled device (CCD), color liquid crystal display (LCD), memory interface, and input/output (I/O) functions. The added burden of an integrated printer such as a resistive thermal type like the aforementioned PTMTL1101A only adds unfavorably to the power dissipation of a digital camera as the compatible cartridge doesn't include a battery.

A problem with integral printers in digital cameras is that they each generally have their own source of power. Sometimes the batteries in the digital camera will reach a low level so that they can not effectively operate the camera and the system is effectively shut down.

SUMMARY OF THE INVENTION

It is an object of the present invention to provide an arrangement of an integral printer in a digital camera wherein the printer has an insertable cartridge which contains its own battery that can effectively be used.

A further object of the invention is when the power supply for the digital camera is at a low level so that it can not effectively operate the camera to use the battery of the insertable cartridge.

These objects are achieved by a digital camera having image capture and processing electronics, comprising:
a) means for receiving a first battery for operating the image capture and processing electronics of the digital camera; and
b) an integral printer having a removable cartridge for printing captured images on receivers and including:
  i) cartridge interface and printer actuator electronics; and
  ii) a second battery in the cartridge for operating the cartridge interface and printer actuator electronics.

ADVANTAGES

It is an advantage of the present invention to provide a digital camera which has its own battery and an integral printer which also has its own battery.

It is another advantage of the present invention to use a battery in a removable cartridge to supply energy to the digital camera when the battery in the digital camera is in a low state or when a user desires to conserve power in the camera battery to thereby prevent the draining of the battery of the digital camera normally used to capture, process, store and transmit images.

It is a further advantage of the present invention to permit the automatic coupling of the printer cartridge battery to the digital camera when the battery in the digital camera is in a low state.

It is a further advantage of the present invention to make the energy of the removable cartridge available to the digital camera for any non-printing operations by allowing the user to selectively actuate a battery selectable switch.

BRIEF DESCRIPTION OF THE DRAWINGS

FIG. 8 is a sectional view taken along lines D—D of the printer of FIG. 6 showing a cross sectional view of a cartridge inserted into an ink jet printer; and FIG. 9 is an enlarged portion of the sectional view shown in FIG. 8.

DETAILED DESCRIPTION OF THE INVENTION

Figure 6:
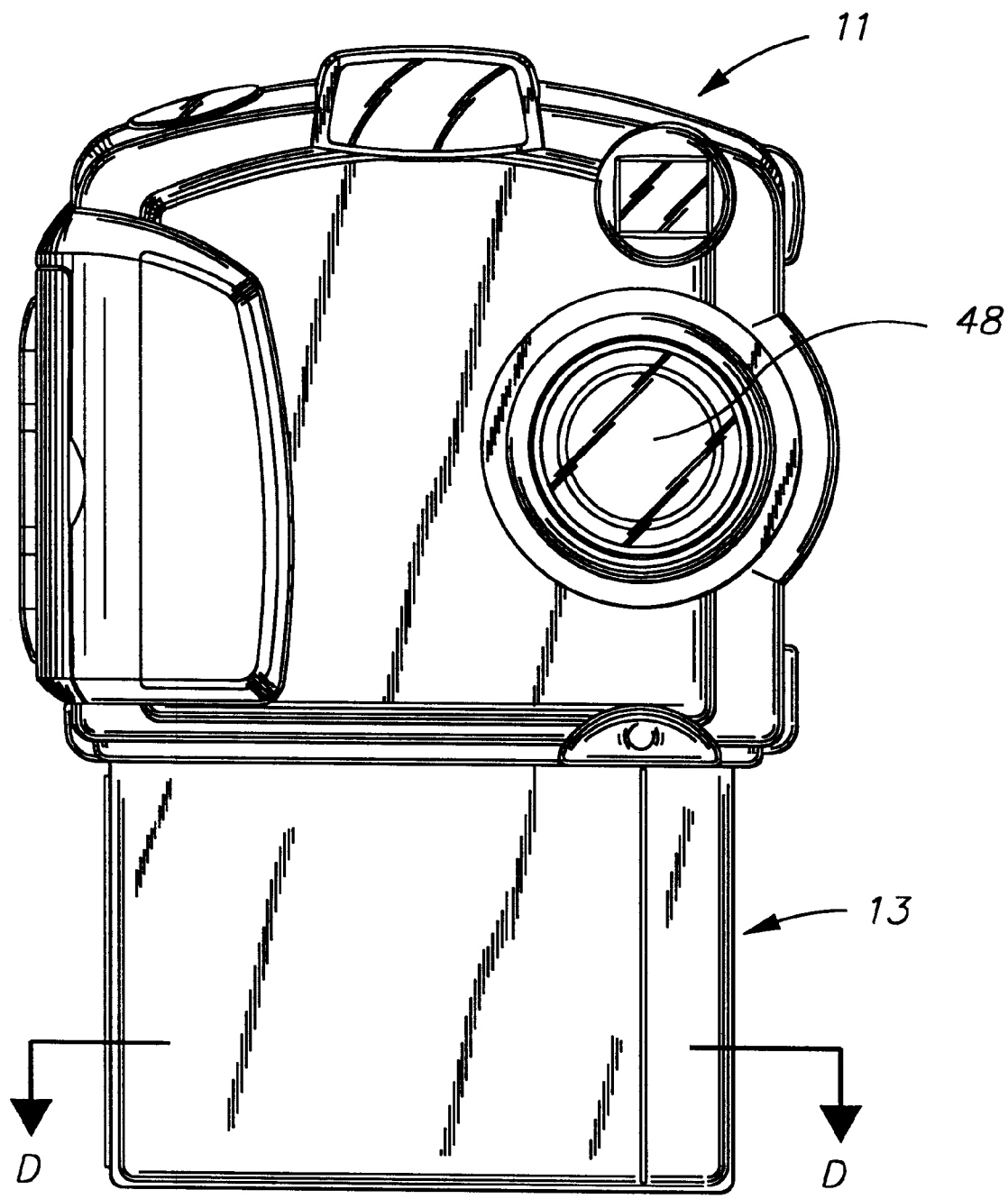
FIG. 6 is a front view of a digital camera having an ink jet printer for receiving the cartridge of FIG. 1.
Figure 7:
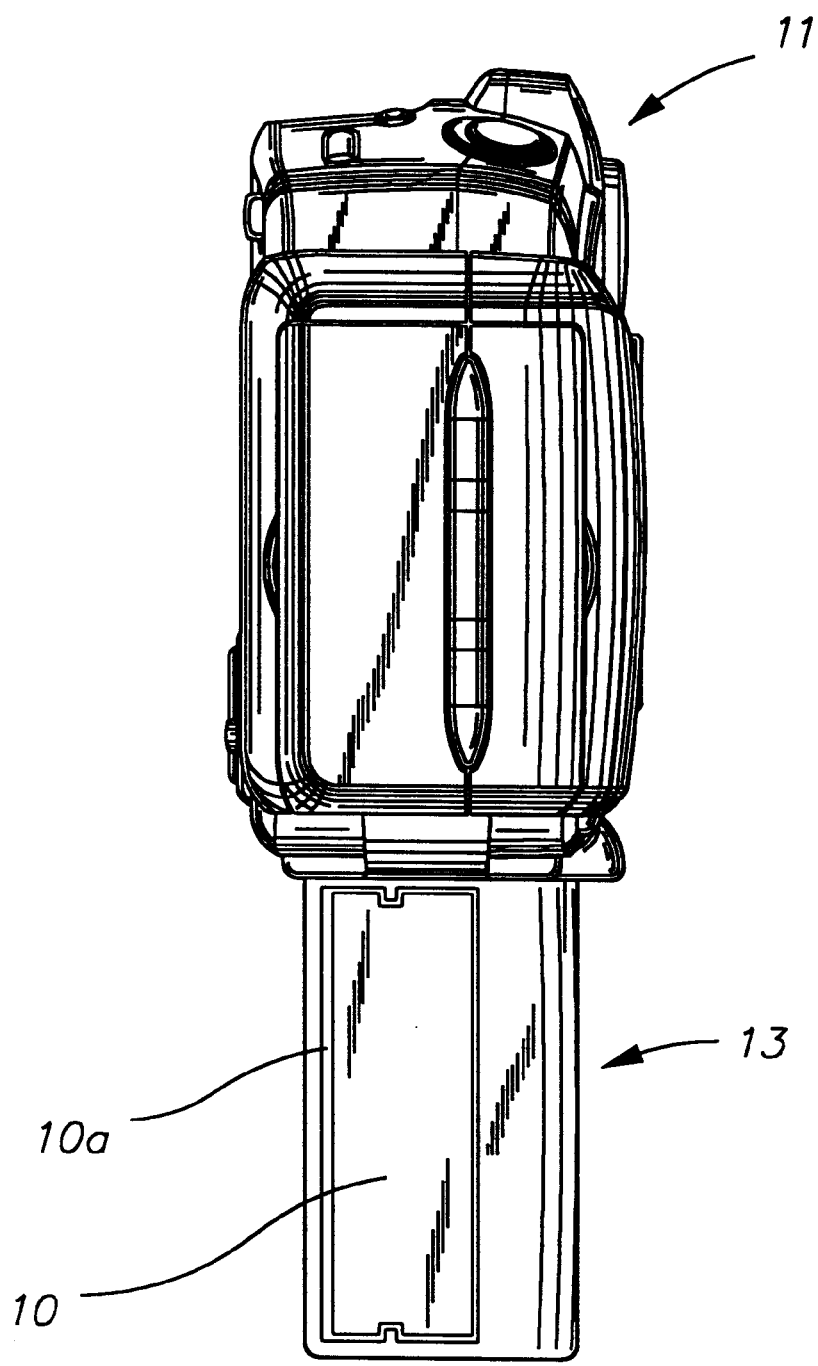
FIG. 7 is a side view of the digital camera of FIG. 6.

The overall structure of the present invention will briefly be reviewed with respect to FIGS. 6 and 7. The present invention uses an insertable cartridge 10 which is inserted into a digital camera 11. The digital camera 11 includes an ink jet printer 13. Further features of the digital camera 11 and ink jet printer 13 will be discussed later.

Figure 1:
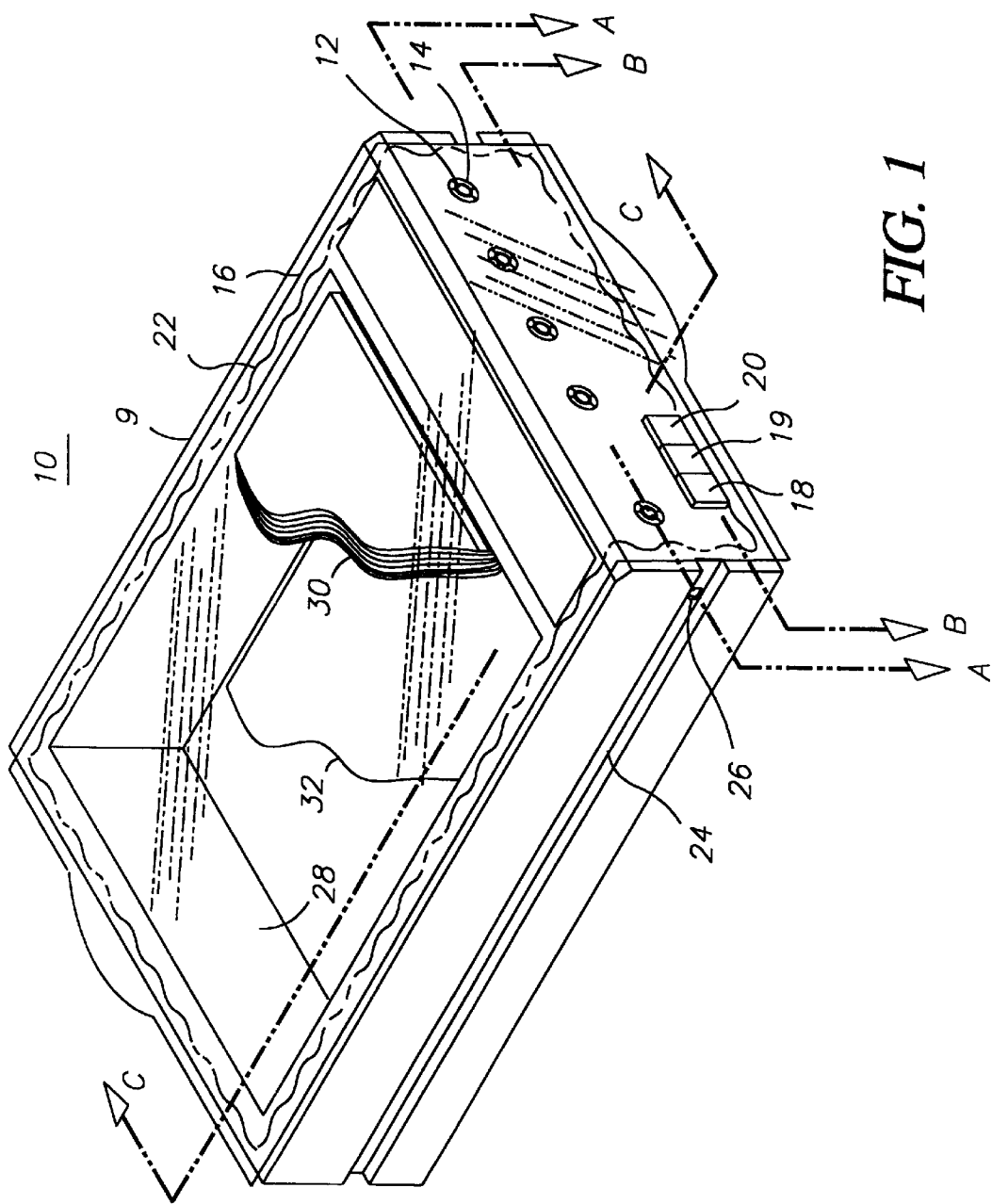
FIG. 1 is perspective of an insertable cartridge for use with a digital camera having an ink jet printer with alignment features, cover seal, ink ports, and identifying contacts.

Turning now to FIG. 1, a perspective view of a cartridge 10 is shown, having a housing 9 provided with five ink reservoirs 38. The housing 9 is provided with a removable cartridge seal 16 which protects identifying contacts 18, 19, and 20, receivers 30 and ink ports 40 prior to use of the cartridge 10. Cartridge seal 16 can be of a Mylar sheet held in position until use by a conventional, low tack adhesive 22 as cartridge seal 16 is used only as protective dust seal. The cartridge seal 16 is removed prior to inserting the cartridge 10 into cartridge opening 10a provided in the digital camera 11 (see FIG. 6). It will be understood that the cartridge seal 16 can contain human readable data printed on the outer surface (not shown) indicative of the date of manufacture, expiration date, printer compatibility, etc.

Identifying contacts 18, 19 and 20 can be formed by the application of an encoded and patterned metallized tape. Each identifying contact 18, 19 and 20 may be metallized or not forming a conductive or non-conductive area. These identifying contacts 18, 19 and 20 provide information of features of an inserted cartridge 10 to the ink jet printer 13 in the digital camera 11. These identifying contacts 18, 19 and 20 provide information (as will be discussed with reference to FIG. 5A) in a manner similar to the DX encodement of 35 mm film cassettes. For example see commonly assigned U.S. Pat. No. 4,982,209 to Pearson. The identifying contacts 18, 19, and 20 are used by the ink jet printer 13 of the digital camera 11 to sense the data represented by the encoded conductive pattern. Such data can represent the manufactured configuration of the cartridge 10 with respect to the preloaded media types such as plain or coated paper, ink color set such as photographic or fluorescent, and media quantity as shown in Table 1 below.

TABLE 1

| Cartridge Details | Identifying Contact 20 | Identifying Contact 19 | Identifying Contact 18 |
| --- | --- | --- | --- |
| Glossy Photomedia/Ink (24) | L | L | L |
| Glossy Photomedia/Ink (36) | L | L | H |
| Sticker Photomedia/Ink (24) | L | H | L |
| Sticker Photomedia/Ink (36) | L | H | H |
| Matte Photomedia/Ink (24) | H | L | L |
| Matte Photomedia/Ink (36) | H | L | H |
| Glossy Photomedia/Fluorescent Ink (24) | H | H | L |
| Glossy Photomedia/Fluorescent Ink (36) | H | H | H |

L = Low Level Voltage, H = High Level Voltage

Logic levels shown in Table 1 describe the identification of the contents of cartridge 10 with respect to the type and quantity of receivers 30 along with the style of ink contained in ink reservoirs 38. The amount of ink provided during manufacture to the reservoirs and is determined in accordance with the number of receivers to be printed. The identification is accomplished by identifying probe pairs 52, 54 and 56 (see FIG. 5A) contacting identifying contacts 18, 19, and 20 respectively, for the purpose of determining the conductivity of each identifying contact 18, 19, and 20. Identifying probe pairs 52, 54 and 56 are electrically controlled by circuitry (not shown) within the cartridge interface and printer actuator electronics block 46. Typically, a small current will flow across the discrete elements of identifying probe pairs 52, 54, and 56 causing a Low Level Voltage to be sensed by cartridge interface and printer actuator electronics block 46 if the identifying contact was conductive. If current does not flow across the probe pairs, the identifying contact was not conductive and a High Level Voltage is sensed by cartridge interface and printer actuator electronics block 46. The identification information is used by the cartridge interface and printer actuator electronics block 46 to produce a superior resultant printed image.

It should be obvious to one skilled in the art that additional identifying contacts can be used within the scope of the invention as well as other combinations of media and ink which are likely to be requested by users of the system.

Again with reference to FIG. 1, alignment features are formed in the housing 9 and shown as insertion slots 24 which are used in the positioning of cartridge 10 into ink jet printer 13. Battery contacts 26 are formed in such a manner as to protrude into insertion slots 24 with a shape and spring force so as to provide a further alignment feature of the cartridge 10. The battery contacts 26 are formed on either side of a cavity 36 provided in the housing 9 which receives the batteries 34. The battery contacts 26 mount the batteries and provide electrical connection to them while also providing alignment features for the insertable cartridge 10.

Continuing with FIG. 1, the housing 9 with a receiver bay 28 is shown containing a partial view of receivers 30 resting on a spring loaded platen 32 which urges the receivers 30 to the top of the cartridge 10 for access to the ink jet printer 13.

Figure 2:
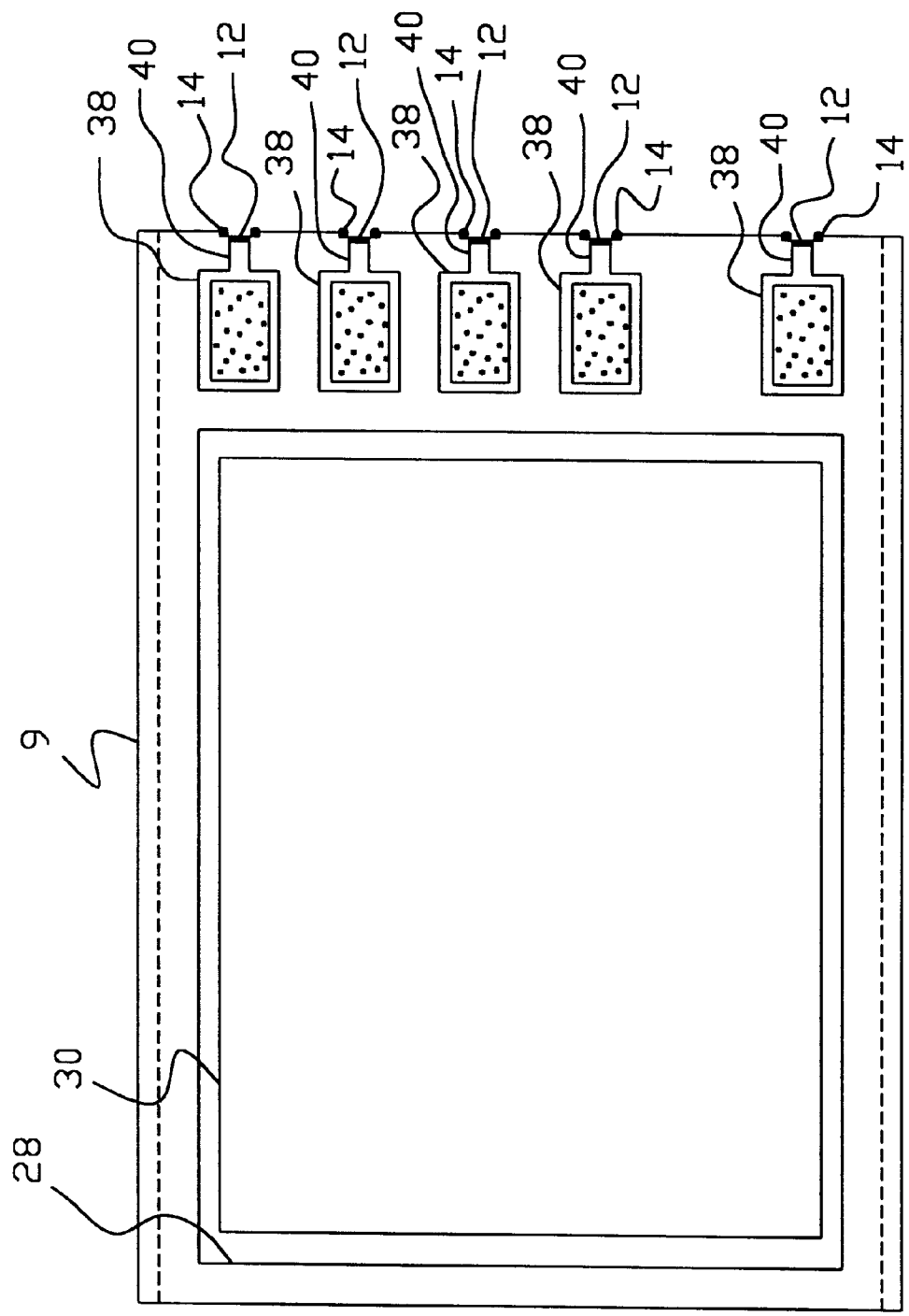
FIG. 2 is a sectional view of the cartridge of FIG. 1 taken along lines A—A showing the relative position of the ink ports and receivers.

Turning now to FIG. 2 which is a cross-section of the cartridge 10, there are a plurality of ink reservoirs 38 formed in the housing 9 for receiving different colored inks. Providing access to each of the ink reservoirs 38 are ink ports 40. A pierceable reservoir seal 12 in the form of a plug is provided covering each of the ink ports 40. An O-ring 14 is also provided so that when a cartridge 10 is inserted into the ink jet printer 13 and piercing probes 42 pierce the reservoir seals 12 the O-rings 14 seal the communication between the ink reservoirs 38 and the ink jet printer 13 to prevent ink leakage.

Figure 3:
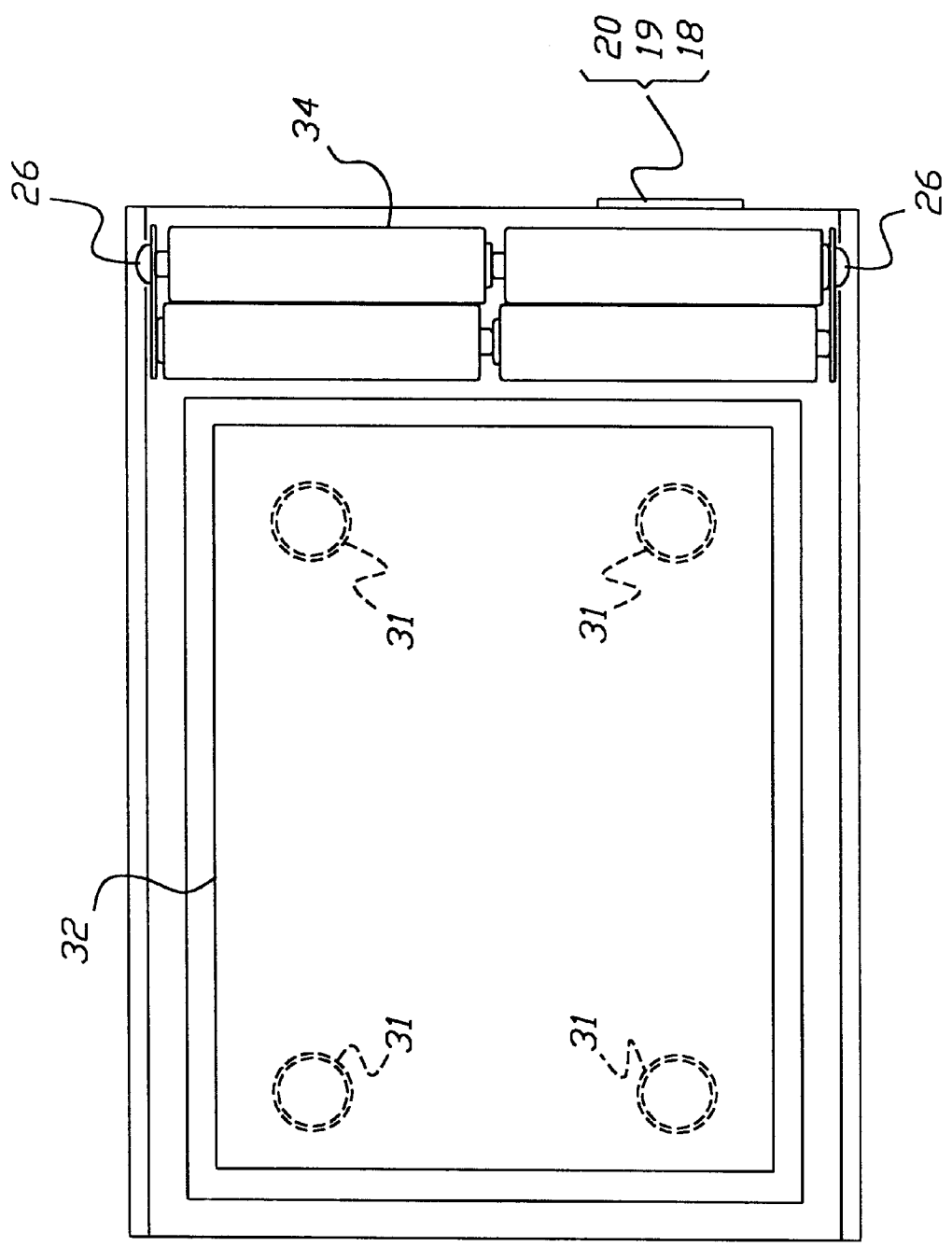
FIG. 3 is a sectional view of the cartridge taken along lines B—B showing receiver bay, batteries, and identifying contacts.
Figure 4:
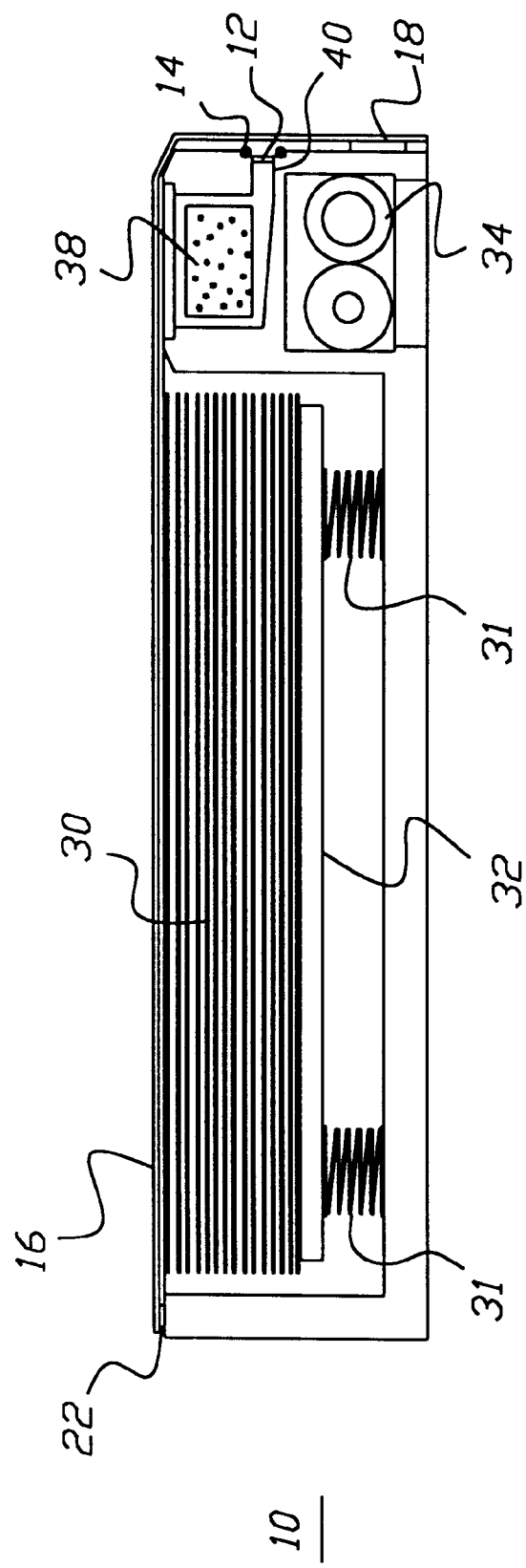
FIG. 4 is a sectional view of the cartridge taken along lines C—C showing a side view of the receiver bay and ink reservoirs relative to the batteries.

FIGS. 3 and 4 show four batteries 34 provided in cavity 36. As is also shown, there are four springs 31 which urges a platen 32 that carries the receivers 30 so that the top receiver 30 can be used by the ink jet printer 13.

Figure 5A:
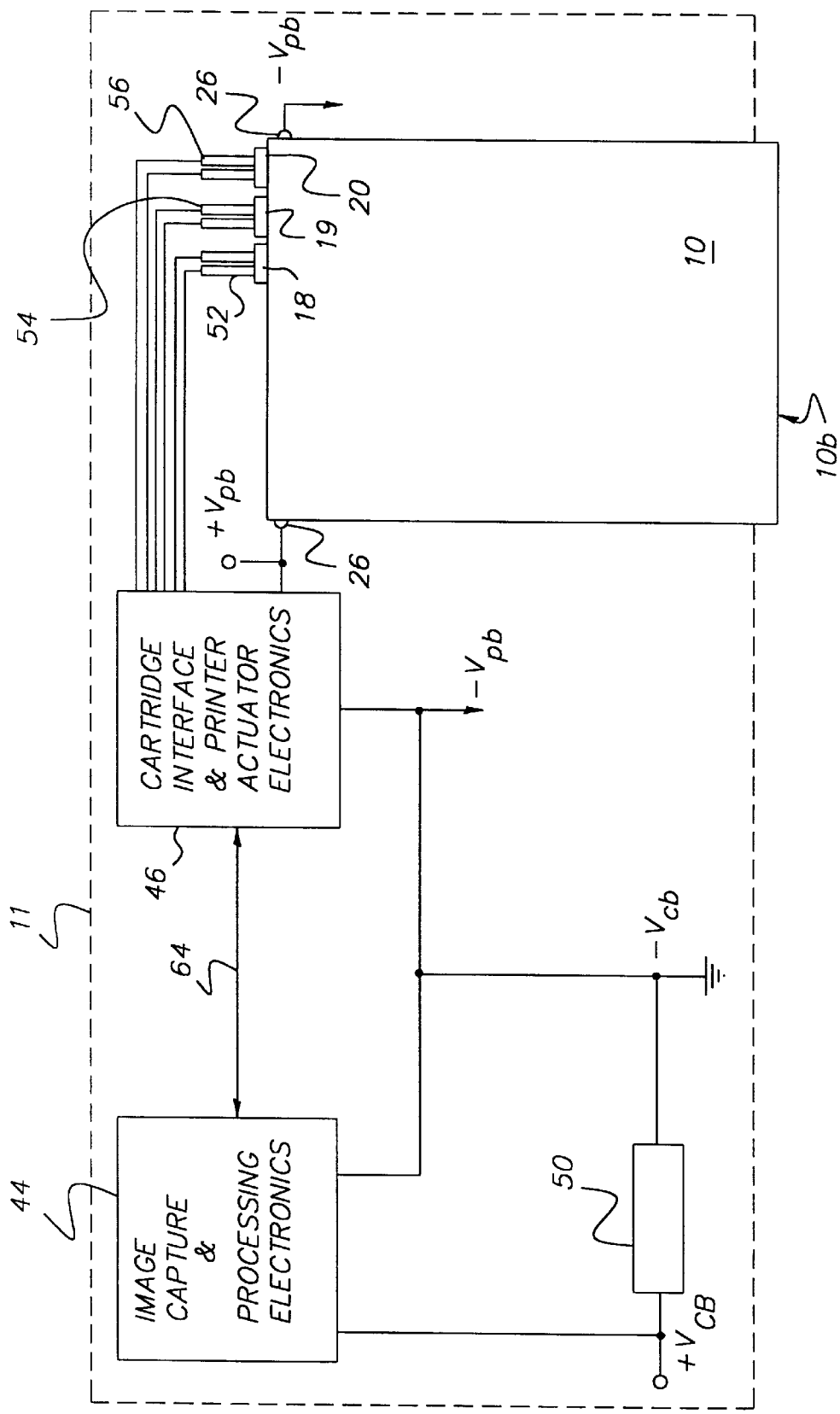
FIG. 5A is a block diagram of the electronic interconnection of the cartridge to the ink jet printer and the capture and imaging processing electronics.

Turning now to FIG. 5A, an image capture and processing electronics block 44 is shown which is included in the digital camera 11. The image capture and processing electronics block 44 will be understood to include all the necessary elements to acquire and store images electronically via an image sensor (not shown) as is found in well known digital camera apparatus such as the aforementioned DC-260 digital camera manufactured by the Eastman Kodak Company. As shown in FIG. 6, the digital camera 11 includes a lens 48 and an image sensor (not shown) both of which are controlled by the image capture and processing electronics block 44 and furthermore capture a digital image. The image capture and processing electronics block 44 stores the captured image in a digital format and processes such image for use by the ink jet printer 13 which is shown generally in FIG. 6. Continuing with FIG. 5A, cartridge 10 is shown inserted into digital camera 11 in the direction of the arrow 10b. Battery contact 26 on each side of cartridge 10 makes an electrical connection between the cartridge 10 and the power supply voltages denoted as +Vpb and −Vpb which are used to supply electrical power to the ink jet printer 13 of the digital camera 11 and the cartridge interface and printer actuator electronics block 46 in the normal mode of operation. In such a manner, the user is always assured that the necessary power to print an image is available each time a cartridge 10 is loaded. However, in the event that the user experiences a loss of power to the image capture and processing electronics block 44 due to the failure of the digital camera battery 50, the user can exercise the option of actuating a battery selectable switch 66 located on the external surface of the camera as depicted in FIG. 7. The battery selectable switch 66 is a common single pole multi-throw switch (one switch terminal currently not assigned) which allows the batteries 34 of the cartridge 10 to be additionally coupled to the image capture and processing electronics block 44. It should be noted that the user may choose to actuate the battery selectable switch 66 at any time to conserve power in the digital camera battery 50. One such relevant time would include the exhaustion of cartridge 10 of receivers 30 where power may still remain in batteries 34. Image data, addressing data, and control data necessary for the printing operation travel between the image capture and processing electronics block 44 and the cartridge interface and printer actuator electronics block 46 along data bus 64.

Figure 5B:
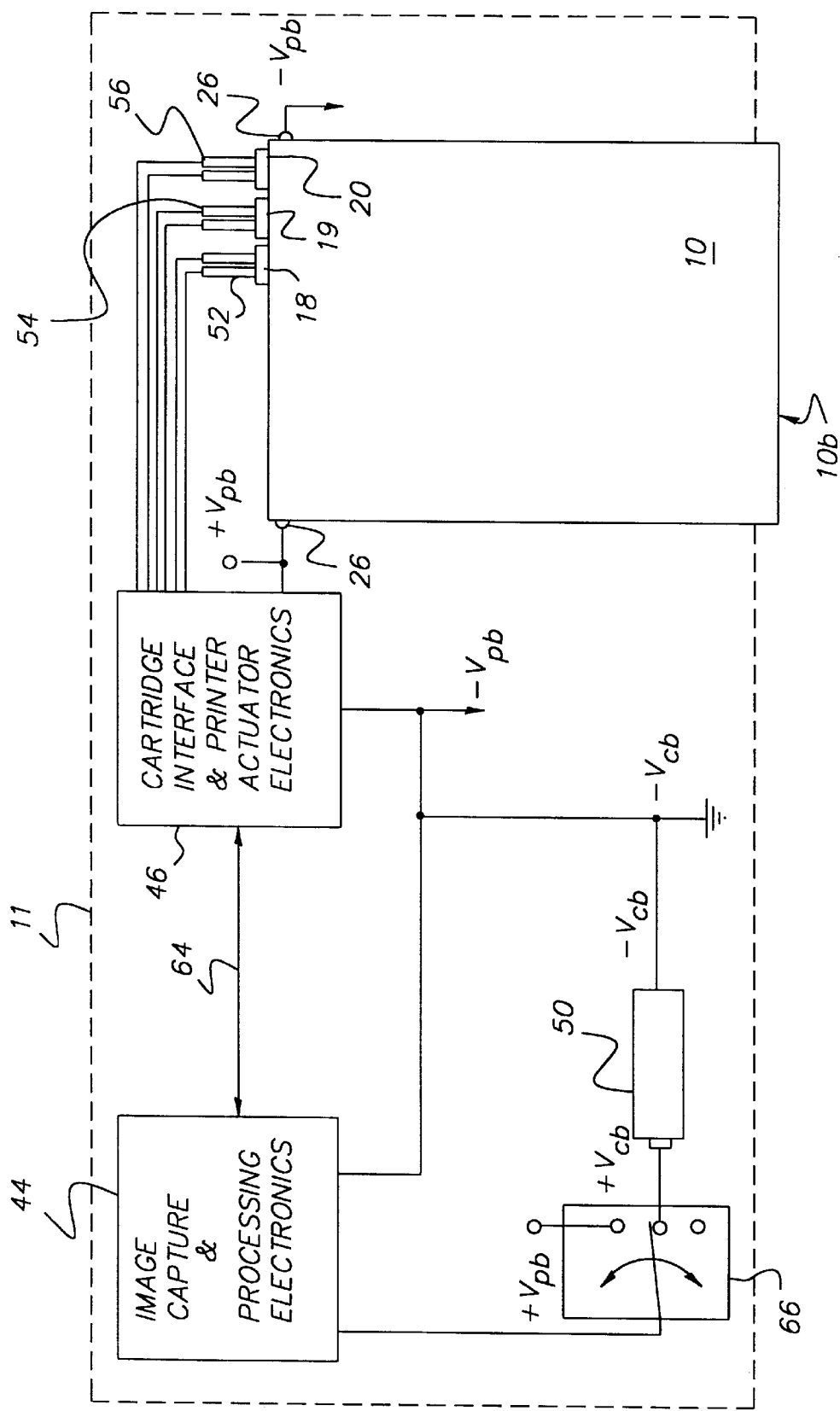
FIG. 5B is another block diagram showing more details of sensing the voltage of the digital camera battery and for automatically coupling the battery in the insertable cartridge to the digital camera.

In FIG. 5B, an alternative electrical arrangement is shown where battery monitor circuit 72, powered by the batteries 34 of cartridge 10, monitors the digital camera battery 50. Battery monitoring circuit 72 causes indicator 68 to light when it detects a low power state of the digital camera battery 50. The circuit details (not shown) of battery monitor circuit 72 can easily be implemented with a simple comparator circuit where the comparison threshold is set by a resistor divider network. A second output of the battery monitor circuit 72 is a relay control signal 74 which controls the switching state of a relay 70. When it is determined that the digital camera battery is in a low power state, relay 70 switches the power supplied to the image capture and processing electronics 44 to the batteries 34 of cartridge 10. In this arrangement, battery selectable switch 66 must be in the "NORMAL" position which is shown schematically as position 3. The user may choose to set the battery selectable switch to position 2 which overrides the automatic switching feature and connects only the digital camera battery 50 to image capture and processing electronics 44. Alternatively at any time, the user may choose position 1 of battery selectable switch 66 to override the automatic switching feature and connect only batteries 34 of cartridge 10 to the image capture and processing electronics. To prevent interrupting the power to an operation of the image capture and processing electronics 44 or the cartridge interface and printer actuator electronics 46, a busy signal 76 is sent from the cartridge interface and printer actuator electronics 46 to the battery monitoring circuit 72 causing it to suspend the relay control signal 74 until the busy signal 76 is removed. The busy signal is present when either the image capture and processing electronics 44 or the cartridge interface and printer actuator electronics 46 is engaged in capturing, processing, storing, transmitting, printing or any other operation where a power interruption would be detrimental to the outcome of the operation.

In FIGS. 6 and 7, piercing probes 42, which pierce the reservoir seals 12 are shown in schematic form. The batteries 34 (see FIG. 3) provide power to the cartridge interface and printer actuator electronics block 46. A digital camera battery 50 is shown in FIG. 5A which provides power to the digital camera 11 and the image capture and processing electronics block 44 irrespective of whether or not a cartridge 10 has been inserted into the cartridge opening 10a (see FIG. 7) in the ink jet printer 13 of the digital camera 11.

FIG. 8 is a sectional view of a portion of the taken along lines D—D of the printer of FIG. 6 showing a cross sectional view of a cartridge inserted into an ink jet printer. FIG. 9 is an enlarged portion of the sectional view shown in FIG. 8 and shows the reservoir seals 12 and the piercing probes 42 in more detail. A feeding roller 58 feeds the top receiver 30 along the path shown by an arrow past the ink jet printer 13. A back-up roller 60 presses the receiver sheet against the ink jet printer 13 which prints a line at a time. As shown, the batteries 34 are provided in cavity 36. In FIG. 9, a tube 62 connects the ink reservoir 38 to the ink jet printer 13 after the reservoir seal 12 has been pierced by a piercing probe 42 which includes a sharp pointed tip.

In operation, the cartridge seal 16 is removed from the cartridge 10. The cartridge 10 is inserted into the cartridge opening 10a which has features corresponding to the insertion slot 24 for mounting the cartridge 10. Piercing probes 42 pierce the reservoir seals 12 providing communication between the ink reservoirs 38 and the ink jet printer 13. Identifying contacts 18, 19 and 20 provide feature information to the cartridge interface and printer actuator electronics block 46 for controlling the operation of the ink jet printer 13 as shown in FIG. 5A.

The invention has been described in detail with particular reference to certain preferred embodiments thereof, but it will be understood that variations and modifications can be effected within the spirit and scope of the invention.

What is claimed is:

1. A digital camera having image capture and processing electronics, comprising:
   a) means for receiving a first battery for operating the image capture and processing electronics of the digital camera; and
   b) an integral printer having a removable cartridge for printing captured images on receivers and including:
      i) cartridge interface and printer actuator electronics; and
      ii) a second battery in the cartridge for operating the cartridge interface and printer actuator electronics.

2. A digital camera having image capture and processing electronics, comprising:

a) means for receiving a first battery for operating the image capture and processing electronics of the digital camera; and
b) an integral printer having a removable cartridge for printing captured images on receivers and including:
   i) cartridge interface and printer actuator electronics; and
   ii) a second battery in the cartridge for operating the cartridge interface and printer actuator electronics.
c) means for selectively disabling the first battery and for coupling the second battery to the digital camera for supplying energy from the second battery to operate the image capture and processing electronics of the digital camera.

3. A digital camera having image capture and processing electronics, comprising:
a) means for receiving a first battery for operating the image capture and processing electronics of the digital camera; and
b) an integral printer having a removable cartridge for printing captured images on receivers and including:
   i) cartridge interface and printer actuator electronics; and
   ii) a second battery in the cartridge for operating the cartridge interface and printer actuator electronics.
c) a user controlled power source switch for selectively disabling the first battery and for coupling the second battery to the digital camera for supplying energy from the second battery to operate the image capture and processing electronics of the digital camera.

4. A digital camera having image capture and processing electronics, comprising:
a) means for receiving a first battery for operating the image capture and processing electronics of the digital camera; and
b) an integral printer having a removable cartridge for printing captured images on receivers and including:
   i) cartridge interface and printer actuator electronics; and
   ii) a second battery in the cartridge for operating the cartridge interface and printer actuator electronics.
c) means for sensing that the first battery is in a low condition and for coupling the second battery to the digital camera for supplying energy from the second battery to operate the image capture and processing electronics of the digital camera.

5. The digital camera of claim 4 further including indicator means for indicating that the first battery is low and the second battery has been coupled to the digital camera.

6. The digital camera of claim 4 further including means for preventing operation of the relay when a busy signal is present.

7. A digital camera having image capture and processing electronics, comprising:
a) means for receiving a first battery for operating the image capture and processing electronics of the digital camera; and
b) an integral printer having a removable cartridge for printing captured images on receivers and including:
   i) cartridge interface and printer actuator electronics; and
   ii) a second battery in the cartridge for operating the cartridge interface and printer actuator electronics.
c) the cartridge interface and printer actuator electronics controlling a relay and means for sensing that the first battery is in a low condition and for operating the relay to couple the second battery to the digital camera for supplying energy from the second battery to operate the image capture and processing electronics of the digital camera.

8. The digital camera of claim 7 further including indicator means for indicating that the first battery is low and the second battery has been coupled to the digital camera.

9. The digital camera of claim 7 further including means for preventing operation of the relay when a busy signal is present.

* * * * *